Dec. 20, 1966 W. F. MARANTETTE ETAL 3,293,442
WORK POSITION PROGRAMMING AND RECORDING SYSTEM
USING SYMBOLS ON A TRANSPARENT MEDIUM
Filed Dec. 16, 1963 2 Sheets-Sheet 1

INVENTORS:
WILLIAM F. MARANTETTE
RUTH B. MARANTETTE
BY Elliott & Pastoriza
ATTORNEYS Dec. 20, 1966    W. F. MARANTETTE ETAL    3,293,442
WORK POSITION PROGRAMMING AND RECORDING SYSTEM
USING SYMBOLS ON A TRANSPARENT MEDIUM
Filed Dec. 16, 1963    2 Sheets-Sheet 2

INVENTORS:
WILLIAM F. MARANTETTE
RUTH B. MARANTETTE
BY
Elliott & Pastoriza
ATTORNEYS

United States Patent Office
3,293,442
Patented Dec. 20, 1966

3,293,442
WORK POSITION PROGRAMMING AND RECORDING SYSTEM USING SYMBOLS ON A TRANSPARENT MEDIUM
William F. Marantette and Ruth B. Marantette, both of 20624 Earl St., Torrance, Calif. 90503
Filed Dec. 16, 1963, Ser. No. 330,847
6 Claims. (Cl. 250—219)

This invention relates to a system for automatically positioning a work in a machining operation at a succession of coordinate points in an X and Y coordinate plane in accordance with a pre-arranged program. The invention also contemplates recording means for generating a program in accordance with a sequential positioning of a work at various different coordinate points so that the recorded program may then be used to repeat the sequential positioning of the work in an automatic manner.

In our co-pending application Serial No. 293,642, filed July 9, 1963 and entitled Two Axis Photoelectric Positioning System, there is disclosed a unique system for enabling substantially exact centering of a work or other member at given coordinate points after the work has been brought into the vicinity of such coordinate points. The instant invention may be used for the purpose of transferring a work to substantially the coordinate points in question, the two axis positioning system of our co-pending patent application then functioning to insure exact positioning of the work at the coordinate points, or serving as a second check as to such positioning.

Accordingly, it is a primary object of this invention to provide a novel position programming and recording means for moving a work successively to a plurality of desired locations specified by given coordinate points in accordance with a given program all in a completely automatic manner to the end that machining operations at the various desired coordinate points or in transit between given coordinate points in the case of milling operations, on the work may be carried out automatically and without human intervention.

More particularly, it is an object to provide a novel two axis position programming and recording system in which a work may be successively moved to a plurality of different positions specified by given coordinate points and in which there is included a recording means for enabling generation of a program of such coordinate points so that the sequential positioning may subsequently be carried out automatically by means of the generated programs.

A particular object of this invention is to provide a novel system for effecting the automatic drilling of printed circuit boards by means of a program initially generated by the system when a first board is drilled in accordance with coordinate points on a master template, so that subsequent boards may be drilled automatically by employing the generated program in the system.

Briefly, these and other objects and advantages of this invention are attained by providing a movable table for supporting a work such as a printed circuit board. Suitable X axis position and Y axis position servo motors are provided for moving the table in X axis and Y axis directions in response to signals received by the servo motors. Associated with each servo motor is a position program and recording means for providing a control signal to operate the motor and thereby move the table along the corresponding axis to a desired coordinate point on the axis. A position indicating means in turn is responsive to the position of the table and connects to the associated position program and recording means for providing an indication therein of the position of the table. When the indicated position corresponds to the program position in the position programming and recording means, the signals to the servo motor are terminated so that the table, and thus the work, are held at the desired coordinate point.

In addition, each of the position programming and recording means includes a means for recording an indicated position of the table so that a new program may be generated for use in subsequent operations. As a result, the table and work may automatically be re-positioned to a succession of desired coordinate points in accordance with the generated program.

A better understanding of the invention will be had by now referring to a preferred embodiment thereof as schematically illustrated in the accompanying drawings, in which.

Figure 1:
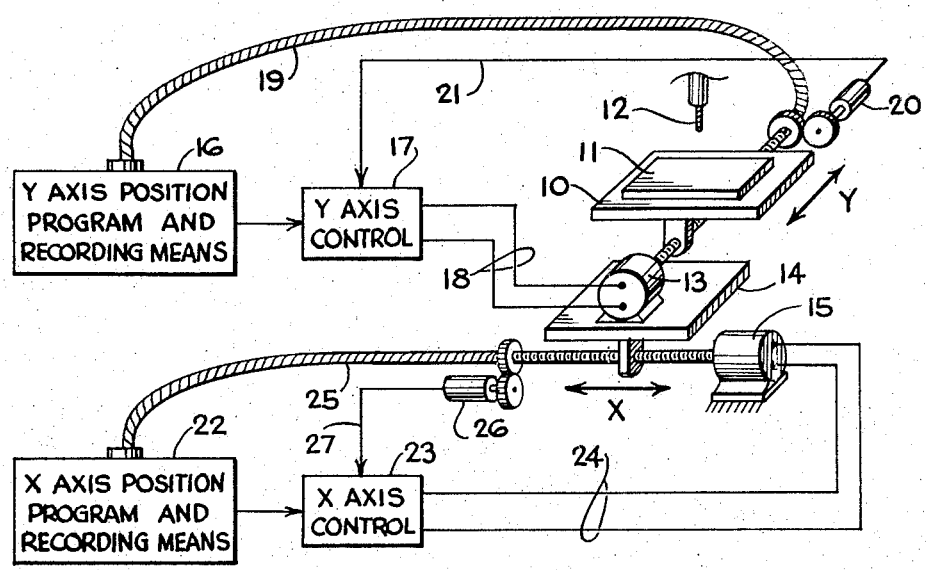
FIGURE 1 is a block diagram partly schematic in form illustrating the basic system of the invention as used for drilling printed circuit boards.

Referring first to FIGURE 1, there is shown in the upper right hand portion a work table 10 supporting a work 11 which may comprise a printed circuit board. Disposed above the work 11 there is illustrated a drill 12 adapted to be automatically lowered to drill a hole in the work 11 at a desired position of the work which is specified by X and Y axes coordinates. Movement of the table 10 and thus the work 11 along the Y axis direction is effected by a Y axis position servo motor 13 carried on a platform 14. The entire table 14 and Y axis servo motor 13 in turn are moved in an X axis direction by an X axis position servo motor 15.

The servo motors are arranged to move the table 10 in positive X and Y axes directions in response to positive signals received therein and to move the table in opposite X and Y axes directions in response to negative or opposite polarity signals received therein. When no signals are received in the servo motors, the servo motors will hold the table stationary.

The Y axis servo motor 13 is energized by a Y axis position program and recording means 16 connected to a Y axis control means 17 providing signals through power leads 18 to the motor 13. The control signals passed from the Y axis positioned program and recording means 16 to the Y axis control means 17 are generated by a programming structure within the block 16. A Y axis position indicating means in the form of a flexible shaft 19 extending from the Y axis servo motor 13 to the block 16 provides an indication of the position of the table from a given starting point along the Y axis. In other words, the number of revolutions of the flexible shaft 19 will provide an indication within the block 16 of the actual position of the table 10 at all times. This position is essentially compared to the program position within the block 16 and if it is different from the program position, signals are provided to actuate the servo motor 13 until the table 10 is at a coordinate position corresponding to the indicated position by the flexible shaft 19. At this point, the signals from the Y axis control means 17 to the servo motor are terminated.

The signals for operating the X axis position servo motor 15 are similarly derived from an X axis position program and recording means 22 providing a control signal to an X axis control means 23 in turn passing signals through power leads 24 to the servo motor 15. An X axis position indicating means in the form of a flexible shaft 25 similar to the flexible shaft 19 extends from the X axis servo motor 15 to the X axis position program and recording means 22 as shown. The operation is identical to that of the Y axis position and recording means in that if the indicated X axis position is different from the program position, signals will be provided to the X axis servo motor. When the moved position corresponds to the program position, no further signals will be provided to the X axis servo motor so that the table will be positioned at a desired X axis coordinate point.

In order to avoid overshooting of the table along the Y axis, there is provided a feedback means in the form of a voltage generator 20 for passing an output signal along a Y axis feedback line 21 in response to movement of the table. This output signal is of opposite polarity to the control signals passed to the Y axis control means 17 and is summed with the control signal so that the resultant output signal along the lines 18 for energizing the Y axis servo motor 13 is critically damped as the table approaches the Y axis coordinate position. Similarly, an X axis feedback signal is provided from an X axis voltage generator 26 passing an opposite polarity signal in response to movement of the table to the X axis control means 23 so that the signals on the leads 24 to the X axis servo motor 15 are critically damped as the table approaches the desired X axis coordinate.

Figure 2:
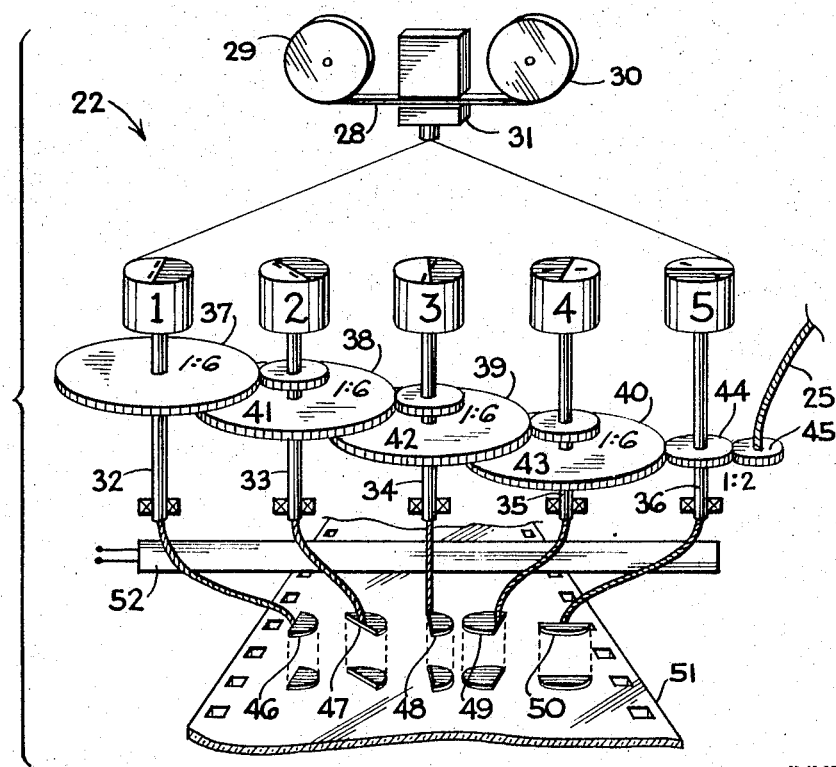
FIGURE 2 is an enlarged perspective of a portion of the position program and recording means incorporated within the block 22 of FIGURE 1.

Referring now to FIGURE 2, the program and recording means for the X axis position program and recording means structure illustrated in FIGURE 1 will be described in detail. Since the Y axis position program and recording means operates in the same manner, description of one will suffice for both. As shown in FIGURE 2, the programming medium takes the form of a film 28 arranged to be passed from a pay-out reel 29 to a take-up reel 30 through a light projection system 31. The film 28 includes a succession of groups of symbols each group containing a plurality of individual symbols constituting a code for a desired coordinate point. In the embodiment chosen for illustrative purposes, there are provided five symbols in each group on the film 28 corresponding to a code for a given coordinate point along the X axis. The next successive group of symbols on the film 28 corresponds to another coordinate position which may be widely spaced along the X axis from the first coordinate position.

The projected group of symbols is displayed on a plurality of photo-cell means indicated by the numerals 1, 2, 3, 4 and 5 so positioned that each symbol of the group falls on a corresponding photo-cell means. The various photo-cell means in turn are rotatably mounted as by shafts 32, 33, 34, 35 and 36, respectively. As shown, the photo-cell means are mechanically coupled together as by large gears 37, 38, 39, and 40 provided on the shafts 32, 33, 34 and 35 and by smaller gears, 41, 42, 43 and 44 respectively mounted on the shafts 33, 34, 35, and 36. The end gear 44 is coupled to a gear 45 in turn adapted to be rotated by the flexible shaft 25 constituting the position indicating means for the X axis servo motor described in conjunction with FIGURE 1. The tooth ratio between the small and large gears in the embodiment chosen for illustrative purposes is 1:6 as indicated. With the arrangement as shown, it will thus be evident that for each rotation of the photo-cell means 1, the photo-cell means 5 will be rotated 1296 times.

In addition, the ratio between the gears 45 and 44 is 1:2 so that the flexible shaft 25 will rotate 2592 times for each rotation of the photo-cell means 1. The coupling of the flexible shaft 25 of the X axis servo motor is such that the table will be caused to move .050 inch for each revolution of the fastest moving photo-cell means 5. Since the slowest moving photo-cell means 1 will only complete one half of a revolution after the fastest photo-cell means 5 has rotated 648 times, one half revolution of the slowest photo-cell means 1 will result in 32.40 inches of movement of the table along the X axis or a little more than 2½ feet, which is more movement than necessary for the most widely spaced X axis coordinate points on the work 11.

The projected symbols from the projector 31 on to the respective photo-cell means 1 through 5 are in the form of light and dark areas preferably defined by half circles such that each photo-electric cell means is irradiated by a half circle of light. As will become clearer as the description proceeds, each of the photo-cell means includes a pair of individual photo-cells or photo-diodes connected so that an output signal individual to each photo-cell means is provided when the pair of diodes are not equally energized by the projected light in the corresponding symbol. However, when the photo-cells in each pair are equally energized as when they both fall within a light area of each symbol or both fall within a dark area or are equally irradiated, no signal will be derived from the cell. As a consequence, there are unique rotative positions between zero and 180 degrees for each of the photo-electric cell means depending upon the particular group of symbols projected thereon, at which no signals will be derived from the photo-cell means.

From the foregoing, it will be evident that if a program group of symbols are projected on to the cells and the half circle light for each symbol is uniquely oriented in a rotative position in accordance with a desired coordinate point, signals will be provided from the photo-cell means until such time as each of the individual photo-cell means is properly aligned with its symbol. The signals derived from the photo-cell means constitute control signals for energizing the X axis servo. The resulting movement of the table 10 of FIGURE 1, along the X axis is indicated by the position indicating flexible shaft 25 which rotates the various photo-cell means. It will be clear accordingly that when the table reaches its desired coordinate position, the various photo-cell means will be properly aligned with the symbols involved so that no signals will be derived therefrom and motion of the table will cease.

In order that a recording of the moved position of the table may be carried out, there are provided a plurality of objects corresponding to half circular shapes as indicated at 46, 47, 48, 49, and 50 connected by suitable flexible shafts for rotation with the individual photo-cell means 1, 2, 3, 4, and 5. These objects 46 through 50 are positioned above a photographic film 51 and caused to cast their shadow thereon when illuminated by a light 52. The light 52 is energized after termination of the control signals to the servo motor so that the relative rotational positions of the various half discs or objects 46 through 50 will be photographed on the film 51 to generate a group of symbols indicative of the table position.

The film 51 is developed within the system preferably by exposing the film with ultraviolet light from the light 52 and then developing the same by heat. The developed film may then be used in the projector of another system corresponding to the projector 31 for operating other machines, or in the event that the initial programming is manually carried out, a subsequent automatic programming may be effected by using the film 51 after development in the projector 31 for display on the photo-electric cell means.

Figure 3:
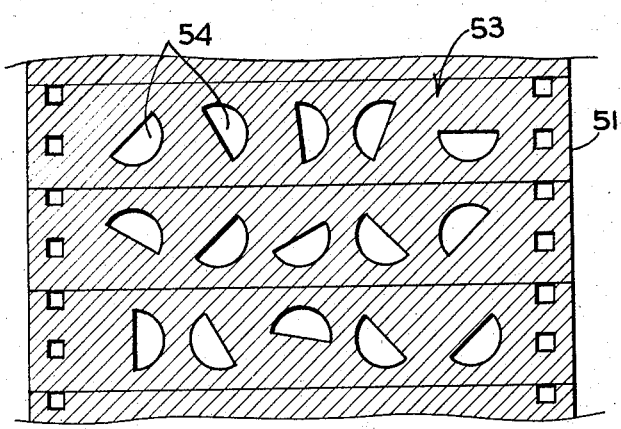
FIGURE 3 is a fragmentary plan view of a programming means in the form of a film for automatically operating the system.

FIGURE 3 illustrates a section of the film 51 after being developed wherein it will be noted that there are provided a succession of groups of symbols, the top group 53 including individual symbols such as indicated at 54. As stated, these symbols define light and dark areas preferably in the form of a circle, half of which is opaque and the other half transparent.

Figure 4:
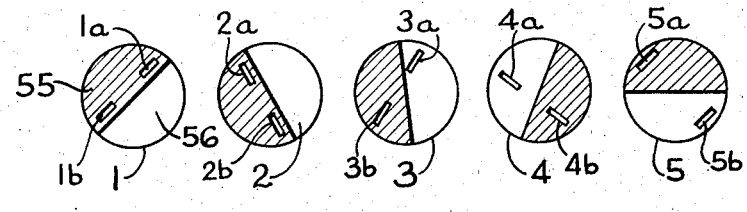
FIGURE 4 is a plan schematic view of a plurality of photoelectric cell means incorporated in the position program and recording system; and, FIGURE 5 is a schematic circuit diagram useful in explaining the operation of the invention.
Figure 5:
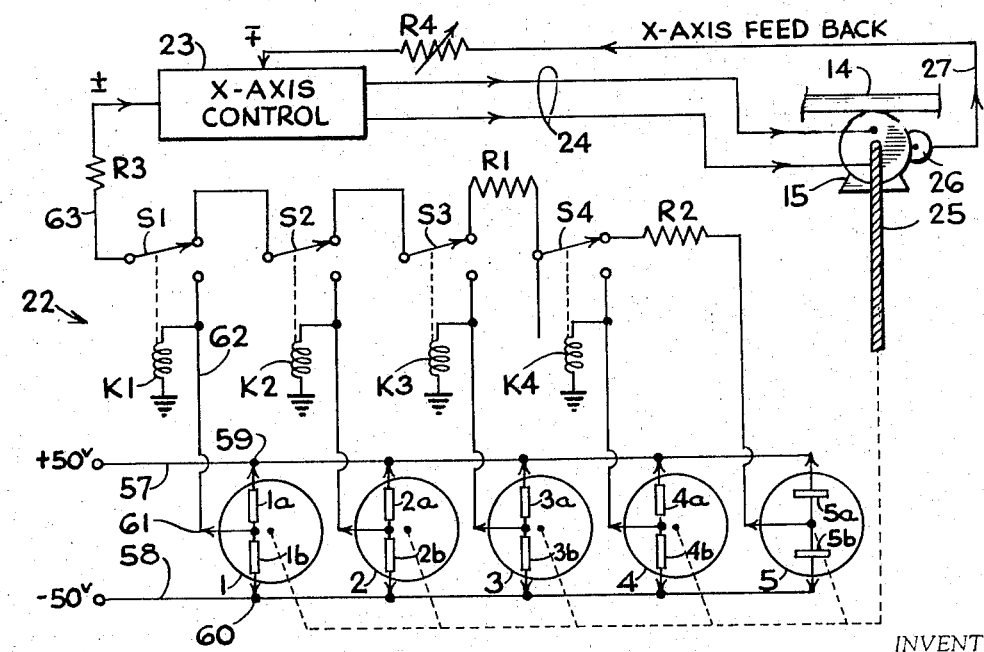

The details of the manner in which signals are derived from the photo-cell means will now become clearer by referring specifically to FIGURES 4 and 5. When the symbols are projected on the top surfaces of the photo-cell means as indicated in FIGURE 4, a black area 55 will be provided on the photo-cell surface and a light area 56 will be provided on the other half of the photo-cell surface. As described heretofore, each of the photo-cell means 1 through 5 includes a pair of photo-electric cells or photo-diodes indicated at 1a and 1b for the photo-cell means 1, 2a and 2b for the photo-cell means 2, 3a and 3b for the photo-cell means 3, 4a and 4b for the photo-cell means 4, 5a and 5b for the photo-cell means 5. The pairs of photo-cells on the photo-cell means 1, 2, 3, and 4 are displaced slightly to one side of a diametrical line so that both cells may be made to fall completely in the dark area 55 or, upon 180 degrees rotation, in the light area 56.

The pair of photo-cells 5a and 5b for the photo-cell means 5, however, are on a diametric line so that more exact positioning of the last photo-cell means with respect to its corresponding symbol will be effected.

In FIGURE 5, the pairs of photo-cells preferably take the form of photo-diodes or photo responsive elements which change their resistance in accordance with the intensity of light falling thereon. The respective pairs of cells are energized by a positive 50 volt power line 57 and a negative 50 volt power line 58. As indicated for the photo-cell means 1, the power lines 57 and 58 connect thereto through slip rings indicated schematically at 59 and 60 to opposite ends of the pair of cells 1a and 1b. The other ends of the cells 1a and 1b are connected together and center tapped to a slip ring 61.

When the photo-diodes 1a and 1b are equally irradiated, their resistances will be equal and the voltage at the center tap point for the slip ring 61 will be zero volts or at ground potential relative to the positive 50 volts and negative 50 volts. Therefore, no signal will be provided on the output line 62. If one of the cells 1a or 1b falls in a light area and the other in a dark area, their resistances will be different so that a potential will be developed at the slip ring 61 having a polarity depending on which cell is in the light and which cell is in the dark area. This positive or negative signal will function to operate a relay K1 to close a switch S1 and thus pass the positive or negative signal on the lead 63 to the X axis control means 23. This signal in turn will result in an output signal on the power leads 24 to the X axis servo motor 15 to move the table 14 in one direction or the other depending on the polarity of the signal from lead 63.

It will be recalled from the description heretofore that the photo-electric cell means 1 will only rotate through one-half of a revolution in response to somewhat over 2½ feet of table movement. Actually, the maximum table movement between the furthest spaced coordinates is less than 2½ feet so that rotation of the photo-cell means 1 is restricted to less than 180 degrees.

The photo-cell means 2, 3, 4 and 5 are similarly connected by slip rings to the power leads 57 and 58. The center taps for photo-cell means 2, 3, and 4 extend to relay coils K2, K3 and K4 for operating switches S2, S3 and S4 in series with the switch S1. The center tap for photo-cell means 5 connects to the upper terminal of switch S4. The arrangement is such that the slowest photo-cell means is positioned so that no signal is received therefrom, control is passed to the next successive photo-cell means which is now less than one-half a revolution from its null point and which will provide a signal until its rotative position corresponds to the rotative position of the symbol projected thereon. When no signal is received therefrom, control is then passed successively onwardly to the next photo-cell until finally no signals are received from any of the photo-cells and as a consequence, the X axis servo 15 will no longer move the table 14 and it will stop at a given coordinate position.

It will be noted that there are provided resistances R1, R2 and R3 connected in series with the lead 63 when the various switches are in their solid line positions shown. The resistances R1 and R2 progressively increase in value so that the signal from the fourth and fifth photo-electric cell means is greatly attenuated at the time it reaches the X axis control means 23.

The X axis feedback voltage line 27 from the voltage generator 26 includes a resistance R4 which is adjusted to a value relative to the resistance R3 such that the feedback signal on the line 27 will have a desired value. This feedback signal is summed with the signal from the lead 63 in the X axis control means. While the signal from the line 27 has a magnitude which constitutes a function of the speed of movement of the table, so that its magnitude will diminish gradually as the table slows down, the diminution of the control signal on the lead 63 as a consequence of the resistances R1 and R2, is considerably greater as the 4th and 5th photo-electric cell means take control. By making the feedback signal on the lead 27 of a polarity opposite to the control signal on the lead 63, the signal on the leads 24 to the servo motor may be critically damped so that substantially no overshooting of the table will occur.

With the foregoing description of all of the various components making up the circuitry of the invention in mind, the overall operation of the position program and recording system will now be set forth.

With reference again to FIGURES 1 and 2, assume first that a printed circuit board 11 on the work table 10 is to have a series of holes drilled therein at given coordinate points as determined by a master template. Considering first the recording features for providing a program in accordance with the invention, for the first drilling operation of the printed circuit board 11, the work table 10 is manually positioned under the drill 12 at a first set of coordinate points. This positioning of the table 10 will be indicated within the X axis position program and recording means 22 and within the Y axis position program and the recording means 16 by the flexible shafts 25 and 19 respectively. These shafts will rotate the various photo-cell means to positions corresponding to the position of the table 10. Rotation of the photo-cell means as shown in FIGURE 2 to positions corresponding to the position of the table 10 will result in rotation of the symbol objects 46, 47, 48, 49 and 50 to such positions. After the table 10 has been moved to the approximate coordinate point position, further control means as described in our co-pending patent application referred to herein may be actuated to effect an exact positioning at the desired coordinate points. The drill 12 is then actuated and at this time, the ultra-violet flash lamp 52 is energized so that a photograph on the film 52 in FIGURE 2 is effected of the relative positions of the objects 46 through 50.

After the drilling is complete, the table 10 is then moved so that the work 11 is positioned under the drill 12 for drilling at a second set of desired coordinate points, this movement being carried out manually in accordance with a master template. The resulting movement will be transferred to the various programming means through the flexible shafts so that different rotative positions will be assumed by the objects 46 through 50. At the time the table is positioned at the second desired coordinate points, the flash lamp 52 is again energized after advancing the film 51 a short longitudinal distance to provide a recording of the subsequent positioning of the symbols.

The foregoing process is repeated until drilling of the first printed circuit board in accordance with the coordinate points on the master template is completed. In this connection, it should be understood that the projector 31 as shown in FIGURE 2 is not used since the program film is not available until the initial drilling and recording has been completed.

Each frame of the film 51 is automatically developed immediately after exposure in the mechanism and after the recording is completed the film is then transferred to the projector 31. For the next printed circuit board to be drilled, it is only then necessary to project the developed film, a portion of which has been illustrated in FIGURE 3, through the projector 31 to irradiate the photo-cell means 1 through 5.

With particular reference now to FIGURES 4 and 5, assume that the first group 53 of half-circles of light symbols 54 have been projected on the photo-cell means 1 through 5. With respect to the slowest moving photo-cell means 1, if the photo-cell pairs 1a and 1b are not equally irradiated, a signal will be generated so to operate the relay K1 and close the switch S1 so that the signal is transferred to the X axis control means. This signal will then result in a power signal on the leads 24 to operate the X axis servo 15. The table 14 will thus be moved in a direction determined by the polarity of the signal, this movement of the table being fed back by the flexible cable to rotate the various photo-cell means until the photo-cell means 1 has its photo-cells 1a and 1b oriented so that each are aligned in the dark band area 55. By offsetting the cells from a diametrical line, no hunting or ambiguity will occur.

It should be noted from the foregoing, that when the switch S1 is closed to receive a signal from the photo-cell means 1, any signals from the remaining photo-cell means will have no effect since the connections to the control signal line 63 are broken when the switch S1 contacts the lead 62 from the photo-cell means 1.

When the cells 1a and 1b are aligned in the dark band area as shown in FIGURE 4, no further signal will be derived from the photo-cell means 1 so that the relay K1 will be de-energized and the switch S1 will open. If the photo-cells 2a and 2b for the photo-cell means 2 are not aligned with the projected symbol, a signal will result to move the table further until the rotative position of the cell means 2 is such that the cells 2a and 2b are aligned or have an equal resistance. At this point, no further signal will be derived from the photo-cell 2 so that the switch S2 will then revert to its solid line position shown in FIGURE 5 and signals from the photo-cell means 3 will serve to operate the servo motor. In FIGURE 4, the orientation of the photo-cell means 3 is shown such that the photo-cell 3a is in a light area and the photo-cell 3b in a dark area. Thus, the resistance of these photo-cells will be different resulting in a signal to cause rotation of the photo-cell means 3 until alignment occurs.

Control will then be passed on to the next photo-cell means 4 and when its cells are of equal resistance, control will be finally passed to the photo-cell means 5. The photo-cell means 5 has its individual cells 5a and 5b along a diametric line so that it must line up extremely accurately with the light and dark area diametric dividing line of the symbol before a null or no signal will be received therefrom. Should there be any overshooting, the signal from the cell will be reversed, thus reversing the direction of the servo motor so that it will settle at the desired position in which the photo-cell means 5 is properly aligned.

With respect to the foregoing, any hunting can be substantially eliminated by means of the feedback voltage on the line 27 as described heretofore. Thus, as will be evident from FIGURE 5, considerable resistance is thrown in the line 63 so that the final signal as the table approaches the coordinate point is diminished a considerable extent. Since this signal is summed with the axis feedback signal on the line 27, the signal on the line 27 becomes relatively larger as the table approaches the exact coordinate point to provide considerable feedback to the X axis control means so that the table will be critically damped.

As already described, when no signals are received from any of the cells, the drill 12 is then automatically actuated to effect a drilling of a hole at the desired coordinate points. After the drilling has been completed, automatic means are provided for moving the programming film 51 to position the next group of symbols in the projector 31 for irradiating the various photo-cell means. Since the next coordinate points to which the work is to be positioned are different from the previous ones, various signals will then be derived again from the photo-cell means to effect automatic moving of the table. Termination of the signals occurs when the indicated table position provided by the flexible shafts to the photo-cell means corresponds to the program position defined by the symbol orientation and the table is stopped at the next set of coordinate points and so forth.

It will, of course, be understood that a similar plurality of photo-cell means are provided for the Y axis position program and recording means so that simultaneous positioning along the X and Y axes will be automatically carried out. In this respect, while the Y axis position and recording means has been shown as a separate block in FIGURE 1, the Y axis photo-cell means in practice are disposed adjacent to the X axis photo-cell means in a single housing and the Y axis film code is on the same film as the X axis code. Thus, a single projector may be used to project the Y and X axis codes simultaneously on the X and Y axis photo-cell means. Also, a Z axis control means could be added if three dimensional positioning is desired.

Further, while applicants' co-pending application has been referred to as a means for insuring exact positioning, such is not necessary once the coded film has been generated, the film itself serving to center the work at the coordinate points within a tolerable error.

As mentioned heretofore, while the invention has been described with respect to drilling circuit boards, it may be used in milling operations to move the work under a milling tool between given coordinate points. These points would be determined by the code on the film. In this case, the feedback signal for providing damping would be used to control the speed of movement of the work.

From the foregoing description, it will be evident that the present invention has provided a unique program position and recording system for automating the production of printed circuit boards and facilitating milling operations and similar work requiring sequential machining operations. It should be understood that while simple relay operated switches have been illustrated in FIGURE 5 for passing the control signals from the various photoelectric cell means to the X axis control means, equivalent switching may be effected by the usual solid state circuitry. Moreover, equivalent motion transferring means such as selsyn systems may be used in place of the flexible shafts 19 and 25. The invention is therefore not to be thought of as limited to the specific schematic embodiment set forth merely for illustrative purposes.

What is claimed is:

1. A system for positioning a work in accordance with a given program comprising, in combination: servo motor means for moving said work in response to a control signal and holding said work in a moved position when said control signal is terminated; programming means connected to said servo motor means for providing said control signal in accordance with a given program; and a position indicating means connected to said programming means and responsive to the position of said work to provide an indication thereof in said programming means, said control signal being generated when the indicated position is different from the program position and terminated when the indicated position corresponds to the program position, said programming means including a transparent medium having a succession of groups of symbols thereon, each group representing a coordinate point at which it is desired to position said work; a plurality of light responsive means corresponding in number to the number of symbols in each group; means for positioning said transparent medium with respect to said light responsive means such that light passes through said medium to said light responsive means and is intercepted by the symbols of one of said groups corresponding to a given coordinate point, each of said light responsive means providing a signal when its position relative to its associated symbol is different from a given position and providing no signal when its position corresponds to the position of its associated symbol, said control signal being responsive to signals from said light responsive means, said position indicating means including a motion transferring means from said servo motor to said light responsive means for effecting relative positioning of said light responsive means and said medium in accordance with the position of said work so that when said work reaches a position corresponding to said given coordinate point, the relative positions of said light responsive means and medium are such that no signals are received therefrom so that said work is held in its moved position until the next successive group of symbols is positioned to intercept light passing to said light responsive means.

2. A system for positioning a work in accordance with a given program comprising, in combination: servo motor means for moving said work in response to a control signal and holding said work in a moved position when said control signal is terminated; programming means connected to said servo motor means for providing said control signal in accordance with a given program; and a position indicating means connected to said programming means and responsive to the position of said work to provide an indication thereof in said programming means, said control signal being generated when the indicated position is different from the program position and terminated when the indicated position corresponds to the program position, said programming means including: a film having a succession of groups of symbols thereon, each group representing a coordinate point at which it is desired to position said work; a plurality of rotatably mounted photo-cell means corresponding in number to the number of symbols in each group; projection means for projecting the symbols of one of said groups corresponding to a given coordinate point simultaneously onto said photo-cell means respectively, each of said photo-cell means providing a signal when its rotative position relative to its associated symbol is different from a given position and providing no signal when its rotative position corresponds to the position of its associated symbol, said control signal being responsive to signals from said photo-cell means, said position indicating means including a motion transferring means from said servo motor to said photo-cell means for rotating said photo-cell means in accordance with the position of said work so that when said work reaches a position corresponding to said given coordinate point, the relative rotational positions of said photo-cell means are such that no signals are received therefrom so that said work is held in its moved position until the next successive group of symbols is projected on said photo-cell means.

3. A system according to claim 2, including recording means in the form of objects representing said symbols connected for rotation with said photo-cell means; and photographing means for photographing the relative rotation of positions of said objects when said photo-cell means are positioned to correspond to said given coordinate point.

4. A system for successively positioning a work and recording the positions of said work along a given axis in accordance with a program of coordinate points along said axis comprising, in combination: a table for supporting said work; a positioning servo motor for moving said table along said axis in response to a control signal and for holding said table from further movement along said axis upon termination of said control signal; a position program and recording means for providing said control signal in accordance with said program of coordinate points; a control means for passing a signal responsive to said control signal to said servo motor; and a position indicating means connected to said position program and recording means and responsive to the position of said table to provide an indication thereof in said position program and recording means, said control signal being generated when the indicated position is different from the program position and terminated when the indicated position corresponds to the program position, said recording means recording the position of said table after said control signal is terminated, said position program and recording means including: a film having a succession of groups of symbols thereon, each group representing a coordinate point at which it is desired to position said table; a plurality of rotatably mounted photo-cell means corresponding in number to the number of symbols in each group; projection means for projecting the symbols of one of said groups corresponding to a given coordinate point simultaneously onto said photo-cell means respectively, each of said photo-cell means providing a signal when its rotative position relative to its associated symbol is different from a given position and providing no signal when its rotative position corresponds to the position of its associated symbol, said control signal being responsive to signals from said photo-cell means, said position indicating means including motion transferring means from said servo motor to said photo-cell means for rotating said photo-cell means in accordance with the position of said table so that when said table reaches a position corresponding to said given coordinate point, the relative rotational positions of said photo-cell means are such that no signals are received therefrom so that said table is held in its moved position until the next successive group of symbols is projected on said photo-cell means, said recording means including objects representing said symbols secured for rotation with said photo-cell means; and photographing means for photographing the relative rotational positions of said objects when said positions correspond to the moved position of said table representing said given coordinate point.

5. A system according to claim 4, in which each of said photo-cell means comprises a rotating disc having a pair of spaced photo-cells mounted thereon, each of said symbols defining a light and dark area when projected so that a signal is provided by said photo-cell means only when its rotative position relative to said projected symbol is such that one of said pairs of photo-cells is in said light area and the other is in said dark area, no signal being provided by said photo-cell means when the output of each cell is equal.

6. A system according to claim 5, including means for generating a feedback signal of polarity opposite to said control signal in response to movement of said table, said control means summing said feedback signal with said control signal to slow down said table as it approaches a position corresponding to said given coordinate point.

References Cited by the Examiner

UNITED STATES PATENTS

| 2,866,506 | 12/1958 | Hierath et al. | 83—71 |
| 3,002,403 | 10/1961 | Estabrook | 77—32.2 |
| 3,077,799 | 2/1963 | Schwartze | 77—32.2 |

RALPH G. NILSON, *Primary Examiner.*

M. ABRAMSON, *Assistant Examiner.*